(12) United States Patent
Hanamoto

(10) Patent No.: US 10,514,650 B2
(45) Date of Patent: Dec. 24, 2019

(54) DRIVE UNIT

(71) Applicant: KYOCERA Document Solutions Inc., Osaka (JP)

(72) Inventor: Katsuhiko Hanamoto, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/253,682

(22) Filed: Jan. 22, 2019

(65) Prior Publication Data

US 2019/0227477 A1    Jul. 25, 2019

(30) Foreign Application Priority Data

Jan. 24, 2018    (JP) ................. 2018-010066

(51) Int. Cl.
| | |
|---|---|
| *G03G 15/00* | (2006.01) |
| *G03G 21/16* | (2006.01) |
| *H02K 7/116* | (2006.01) |
| *H02K 11/22* | (2016.01) |

(52) U.S. Cl.
CPC .......... *G03G 15/757* (2013.01); *G03G 21/16* (2013.01); *H02K 7/116* (2013.01); *H02K 11/22* (2016.01)

(58) Field of Classification Search
CPC ............. G03G 15/757; G03G 15/1615; G03G 21/186; G03G 21/1857; G03G 2221/1657; B65H 79/00; B65H 2403/10; B65H 2403/40; B65H 2403/41; B65H 2403/43; B65H 2403/44; B65H 2403/45; B65H 2403/46; B65H 2403/47; B65H 2403/73

See application file for complete search history.

(56) References Cited

U.S. PATENT DOCUMENTS

2015/0329304 A1* 11/2015 Mochizuki ........... B65H 3/0669
271/9.05

FOREIGN PATENT DOCUMENTS

JP    2007-230666 A    9/2007

* cited by examiner

*Primary Examiner* — Thomas S Giampaolo, II
(74) *Attorney, Agent, or Firm* — IP Business Solutions, LLC

(57) ABSTRACT

A first opposing portion of the coupling includes first ratchet hook and a second opposing portion of the second rotary body includes a second ratchet hook. One of the third opposing portion of the coupling and the fourth opposing portion of the first rotary body has a cam on an end face thereof and the other one has a cam face on an end face thereof. When the first rotary body rotates in a forward direction, a camming action turns on the transmission of torque. When the first rotary body rotates in a backward direction, the transmission of torque is turned off. A protrusion provided on a portion other than the cam or the cam face of the end face of one of the third opposing portion of the coupling and the fourth opposing portion of the first rotary body comes into contact with a portion other than the cam or the cam face of the end face of the other one of the third opposing portion and the fourth opposing portion while the transmission of torque is turned off.

4 Claims, 14 Drawing Sheets

BACK ◄─────────► FRONT

BACK ←→ FRONT

DRIVE UNIT

INCORPORATION BY REFERENCE

This application is based upon, and claims the benefit of priority from, corresponding Japanese Patent Application No. 2018-010066 filed in the Japan Patent Office on Jan. 24, 2018, the entire contents of which are incorporated herein by reference.

BACKGROUND

1. Field of the Invention

The present disclosure relates to a drive unit.

2. Description of Related Art

A typical drive unit that conveys sheets in an image forming apparatus includes a coupling (coupling) that turns on/off transmission of torque from a first rotary body (gear) to a second rotary body (roller body).

SUMMARY

A drive unit according to the present disclosure includes a first rotary body that is supported on a support shaft and rotatable in a forward direction and a backward direction around the support shaft; a second rotary body that receives torque from the first rotary body and rotates together with the support shaft; and a coupling that is supported by the support shaft and reciprocates between the first rotary body and the second rotary body to turn on and turn off transmission of the torque from the first rotary body to the second rotary body. The coupling includes a first opposing portion and the second rotary body includes a second opposing portion, the first opposing portion and the second opposing portion facing each other in the axial direction of the support shaft, and the coupling includes a third opposing portion and the first rotary body includes a fourth opposing portion, the third opposing portion and the fourth opposing portion facing each other in the axial direction of the support shaft. The first opposing portion of the coupling includes a first ratchet hook and the second opposing portion of the second rotary body includes a second ratchet hook, the first ratchet hook and the second ratchet hook engaging each other, and one of the third opposing portion of the coupling and the fourth opposing portion of the first rotary body has a cam on an end face thereof and the other one of the third opposing portion of the coupling and the fourth opposing portion of the first rotary body has a cam face on an end face thereof. When the first rotary body rotates in a forward direction, the coupling shifts from the first rotary body toward the second rotary body as a result of a camming action of the cam and the cam face and turns on transmission of the torque, and when the first rotary body rotates in a backward direction, the coupling shifts from the second rotary body toward the first rotary body and turns off transmission of the torque. At least one protrusion is provided on a portion other than the cam or the cam face of the end face of one of the third opposing portion of the coupling and the fourth opposing portion of the first rotary body, and the at least one protrusion comes into contact with a portion other than the cam or the cam face of the end face of the other one of the third opposing portion and the fourth opposing portion in the axial direction while transmission of the torque is turned off.

DETAILED DESCRIPTION

Embodiments of the present disclosure will now be described in detail with reference to the accompanying drawings.

Figure 1:
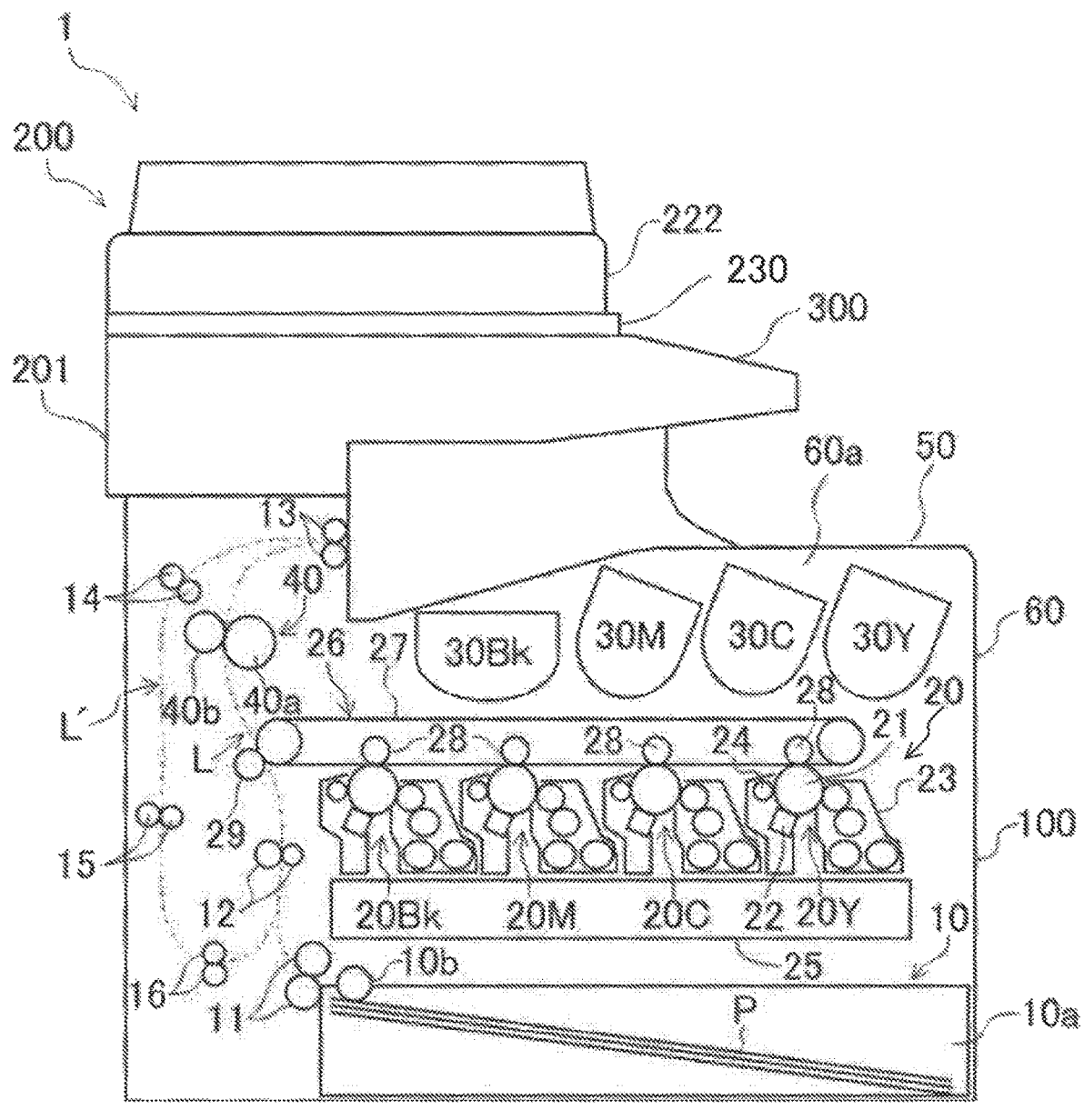
FIG. 1 is a schematic longitudinal cross-sectional view of an image forming apparatus.

FIG. 1 illustrates an image forming apparatus 1 including a document feeder 222 according to an embodiment. The image forming apparatus 1 is an electrographic multifunction peripherals (MFPs). The image forming apparatus 1 includes a body 100, an image reader 200 attached to the top of the body 100, and an operating panel 300 operable by a user. The image reader 200 includes the document feeder 222. In the description below, the term "front" refers to "the front of the image forming apparatus 1 (the side adjacent to the operating panel 300)," the term "back" refers to "the back of the image forming apparatus 1," the term "left" refers to "the left in the front view of the image forming apparatus 1," and the term "right" refers to "the right in the front view of the image forming apparatus 1."

Figure 2:
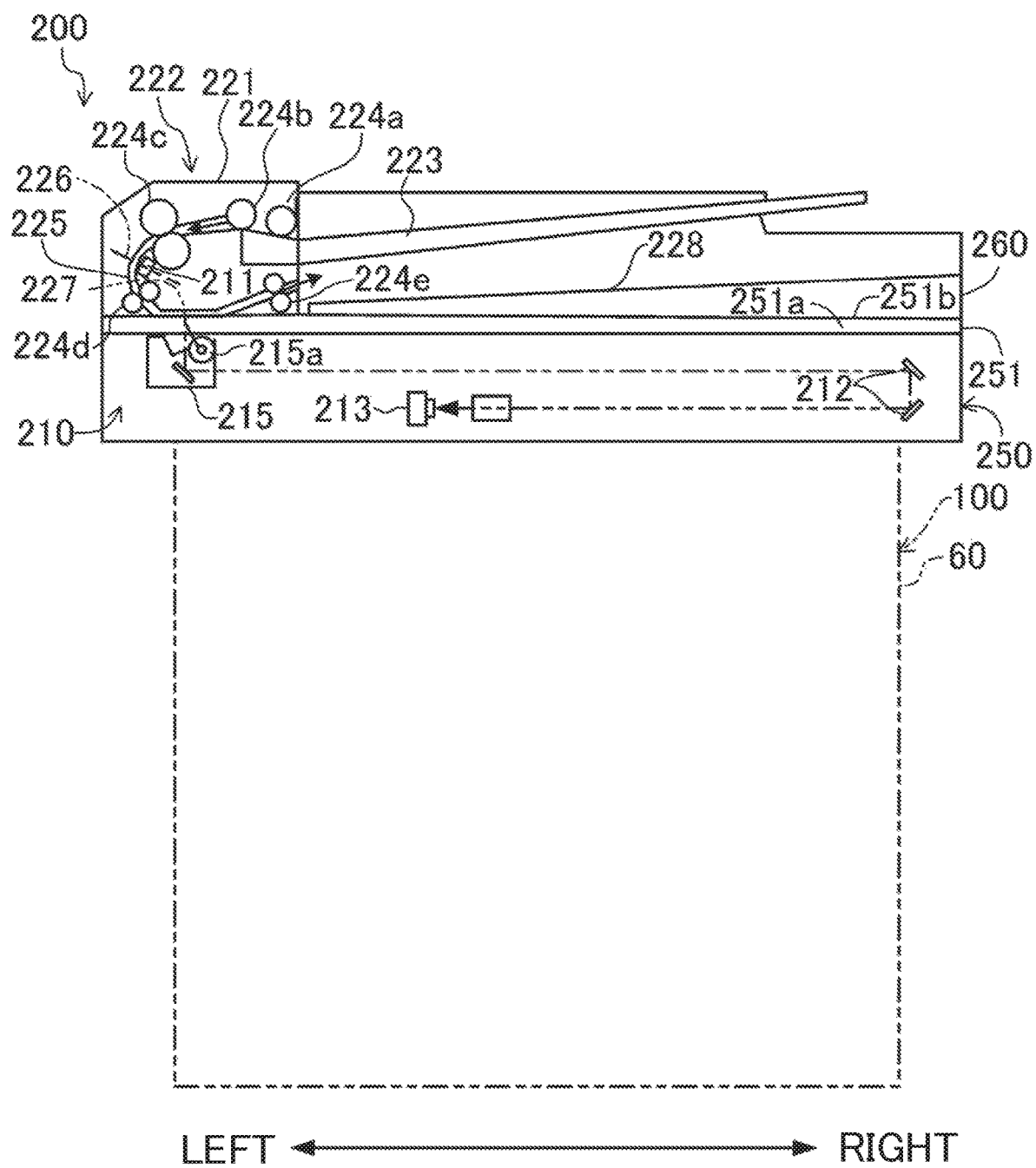
FIG. 2 is a schematic longitudinal cross-sectional view of a document feeder and an image reader.

The body 100 includes a rectangular casing 60, as illustrated in FIG. 2. The image reader 200 is disposed on top of the casing 60.

The casing 60 accommodates a sheet feeder 10, an image forming unit 20, and a fixing unit 40. A sheet conveying path L from the sheet feeder 10 in the casing 60 to a discharge tray 50 is provided with multiple conveying roller pairs 11 to 13 between which sheets P are conveyed. In the casing 60, an inversion conveying path L' branches from the downstream of the sheet conveying path L and merges with the upstream of the sheet conveying path L. Conveying roller pairs 14 to 16 are disposed along the inversion conveying path L'.

The sheet feeder 10 is disposed in the lower portion of the casing 60. The sheet feeder 10 includes a sheet feeding cassette 10a storing sheets P and a pickup roller 10b that picks up one of the sheets P in the sheet feeding cassette 10a and sends this sheet P out from the sheet feeding cassette 10a.

The sheet P sent out from the sheet feeding cassette 10a is fed to the image forming unit 20 through the conveying roller pair 11. The image forming unit 20 includes an array of imaging units 20Bk, 20M, 20C, and 20Y that respectively form toner images of the colors of black, magenta, cyan, and yellow.

The imaging units 20Bk, 20M, 20C, and 20Y each includes a photoconductor drum 21, a charging device 22, a developing device 23, and a cleaner 24. An exposure device 25 that emits laser beams onto the surfaces of the photoconductor drums 21 is disposed below the imaging units 20Bk, 20M, 20C, and 20Y. An intermediate transfer unit 26 is disposed above the imaging units 20Bk, 20M, 20C, and 20Y.

The intermediate transfer unit 26 includes an intermediate transfer belt 27 that runs in contact with the photoconductor drums 21. Primary transfer rollers 28 are disposed on the inner side of the intermediate transfer belt 27 such that the intermediate transfer belt 27 is disposed between the primary transfer rollers 28 and the respective photoconductor drums 21. A secondary transfer roller 29 is disposed downstream of the imaging unit 20Bk in a running direction of the intermediate transfer belt 27 in contact with the surface of the intermediate transfer belt 27. Toner containers 30Bk, 30M, 30C, and 30Y are disposed above the intermediate transfer unit 26. The toner containers 30Bk, 30M, 30C, and 30Y accommodate toners of different colors to be supplied to the developing devices 23 of the respective imaging units 20Bk, 20M, 20C, and 20Y.

In the image forming unit 20, the surfaces of the photoconductor drums 21 are irradiated with laser beams from the exposure device 25 on the basis of specific image data (for example, document image data read by the image reader 200), to form electrostatic latent images. The image forming unit 20 develops the formed electrostatic latent images by the developing devices 23 to form toner images of the different colors. The toner images of the different colors formed on the surfaces of the photoconductor drums 21 are transferred and overlaid on each other on the surface of the intermediate transfer belt 27 by the primary transfer rollers 28.

The toner images transferred onto the intermediate transfer belt 27 are transferred onto a sheet P fed from the sheet feeder 10 by the secondary transfer roller 29. After the toner images are transferred, the sheet P is fed to the fixing unit 40. At the fixing unit 40, heat and pressure are applied to the sheet P sent from the image forming unit 20 while the sheet P passes between a fixing roller 40a and a pressing roller 40b, to fix the toner images to the sheet P.

The sheet P having the toner images fixed at the fixing unit 40 is sent downstream by the rollers 40a and 40b. The sheet P sent from the fixing unit 40 is output into the discharge tray 50 through the conveying roller pair 13. When toner images are to be formed on both sides of a sheet P, the sheet P is sent back to the inversion conveying path L' by the conveying roller pair 13.

With reference to FIG. 2, the image reader 200 includes a substantially cuboid case 250. The top face of the case 250 constitutes a platen 251. The platen 251 includes a rectangular frame 251a and a contact glass 251b fit in the frame 251a. The top face of the contact glass 251b is a document placing surface 251b.

The document placing surface 251b is covered with an operable document holding cover 230. The document holding cover 230 is attached to the platen 251 with a hinge mechanism (not shown) such that the document holding cover 230 is turnable relative to the platen 251. The document feeder 222 is disposed on the top face of the document holding cover 230.

The case 250 accommodates a scanner 210 (i.e., the scanner 210 is disposed below the contact glass 251b). The scanner 210 optically reads the document (not shown) placed on the contact glass 251b and generates image data of the document. In detail, the scanner 210 includes a reflective mirror 212, a charge-coupled device (CCD) 213, and a reader unit 215. The reader unit 215 emits light to the document on the contact glass 251b from a light emitting diode (LED) source 215a. The reflective mirror 212 guides the light reflected at the document to the CCD 213. The CCD 213 generates image data of the document image through photoelectric conversion of the received light. The generated image data is stored in a storage memory (not shown).

The document feeder 222 includes an automatic document feeder (ADF). The document feeder 222 includes a delivery roller 224a, a feeder roller 224b, a first conveying roller 224c, a second conveying roller 224d, and an ejection roller 224e, disposed in this order from the upstream to the downstream of the conveying direction of the document. The rollers 224a to 224e define a U-shaped document conveying path 225. The rollers 224a to 224e are covered from above with a roller cover 221 (see FIG. 2).

The document placed on a document feeder tray 223 is fed to the document conveying path 225 by the delivery roller 224a and the feeder roller 224b of the document feeder 222, passes through the first and second conveying rollers 224c and 224d, and is ejected by the ejection roller 224e onto a sheet discharge tray 228.

A first image reading position 226 and a second image reading position 227 are determined in the document conveying path 225. At the first image reading position 226, a contact image sensor (CIS) 211 reads the image on the back face of the document. The CIS 211 is disposed between the first conveying rollers 224c and the second conveying rollers 224d. At the second image reading position 227, the scanner 210 reads the image on the front face of the document. In this way, the images on both faces of the document are read by the CIS 211 and the scanner 210 during a period between feeding of the document from the document feeder tray 223 and ejection of the document onto the sheet discharge tray 228.

[Structure of Drive Unit 33]

Figure 3:
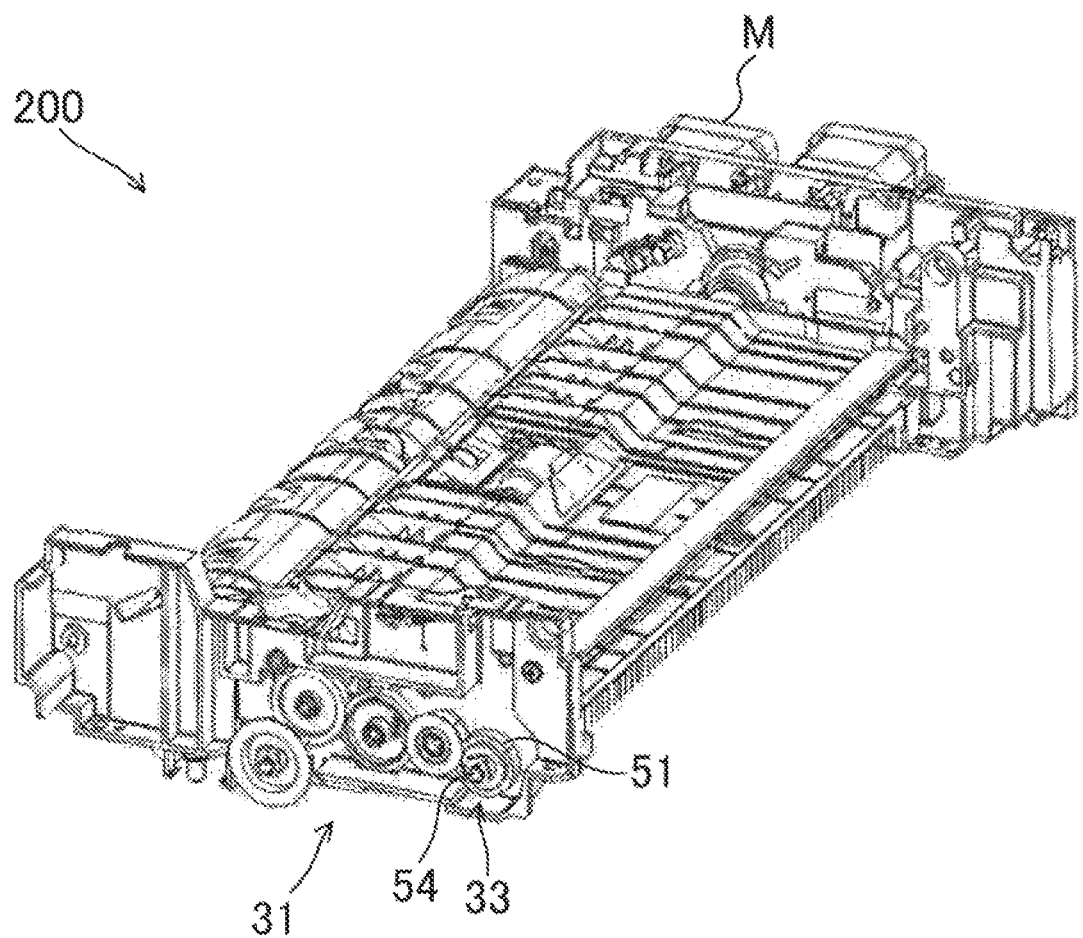
FIG. 3 is a perspective view of the document reader.

A drive unit 33 (see FIG. 3) driving the ejection roller 224e will now be described. With reference to FIGS. 2 and 3, the ejection roller 224e is driven by an electric motor M (equivalent to a drive source) via a gear array 31. The electric motor M can rotate in the forward and backward directions. A driving gear 51 (equivalent to a first rotary body) connected to the gear array 31 is supported at a first end of a support shaft 54 supporting the ejection roller 224e such that the driving gear 51 rotates in the forward and backward directions, as illustrated in FIGS. 2 to 5.

[Structure of Driving Gear 51]

Figure 5:
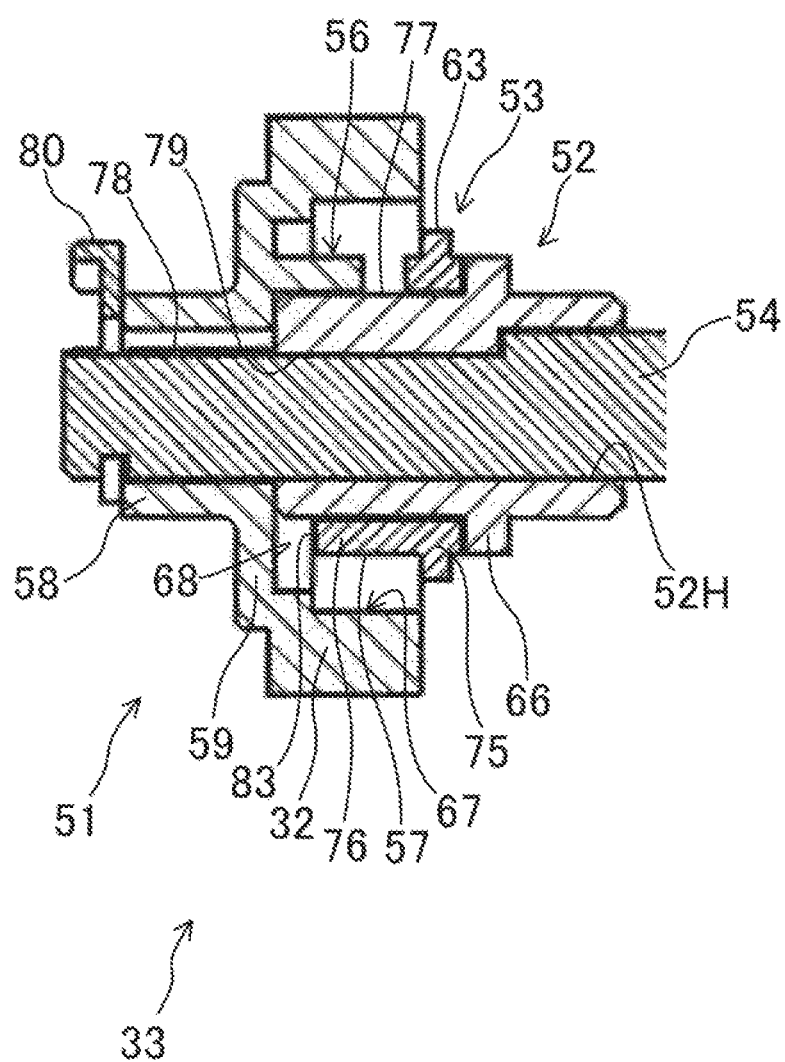
FIG. 5 is a cross-sectional view of the drive unit in the state in which the first ratchet hooks of the coupling are engaged with the second ratchet hooks of the second rotary body.

With reference to FIG. 5, the driving gear 51 has an annular shape and includes a small diameter portion 58 and a large diameter portion 32 having peripheral teeth. The large diameter portion 32 has a stepped depression 67 having an annular cross-section and opening toward a second end of the support shaft 54. A bottom wall 59 of the depression 67 is the sidewall of the step of the large diameter portion 32. The driving gear 51 is composed of resin.

[Structure of Rotary Body 52]

A cylindrical rotary body 52 (equivalent to a second rotary body) that receives torque from the driving gear 51 is fit onto the support shaft 54. A portion of a shaft hole 52H in the rotary body 52 is defined by a shaft-hole portion 79 having a D-shaped cross-section (the D-shaped cross-section is not shown). The shaft-hole portion 79 fits with a shaft portion 78 having a D-shaped cross-section provided on the first end portion of the support shaft 54. As a result, the rotary body 52 and the support shaft 54 rotate together. The rotary body 52 has a first flange 66 protruding radially outward in the intermediate portion in the axial center direction thereof. The first flange 66 has a thick structure. The end face of a rotary-body piece 77 that is disposed closer to the first end of the support shaft 54 than the first flange 66 is in contact with an inner bottom face 68 of the depression 67 in the driving gear 51. The first end portion of the support shaft 54 is provided with a retainer 80 that retains the driving gear 51. The rotary body 52 is composed of resin.

[Structure of Coupling 53]

A coupling 53 that reciprocates between the driving gear 51 and the rotary body 52 is supported on the support shaft 54, as illustrated in FIGS. 5 and 9 to 14. The coupling 53 fits onto the rotary-body piece 77 and reciprocatively slides in the axial direction to turn on/off the transmission of torque from the driving gear 51 to the rotary body 52. A second flange 63 protruding radially outward is disposed on the coupling 53 in the middle area in the axial center direction thereof. The coupling 53 is composed of resin.

[Structures of Coupling 53 and its Vicinity]

Figure 4:
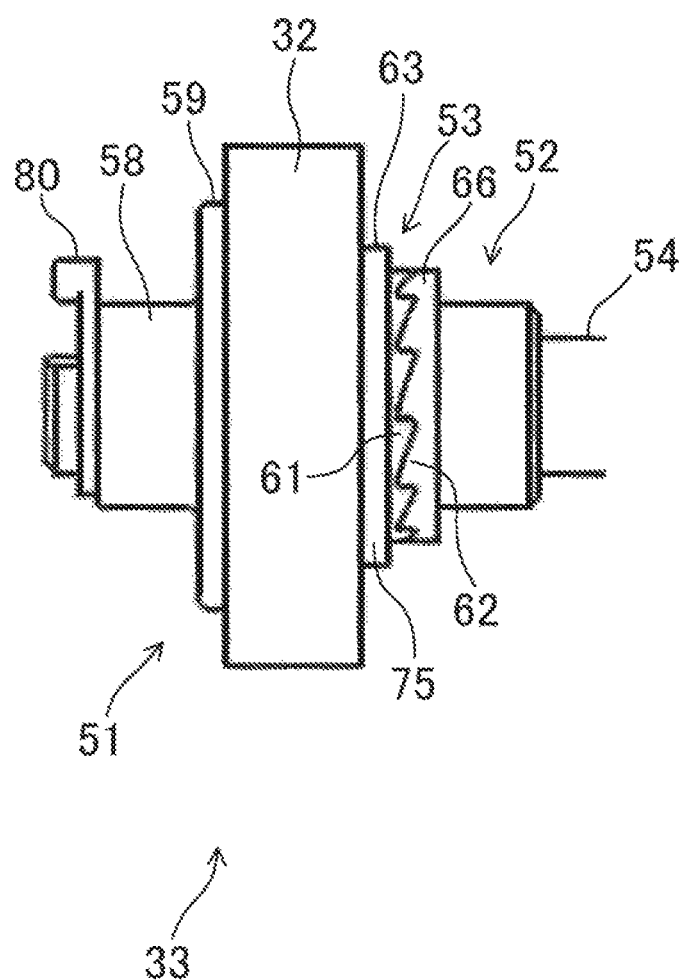
FIG. 4 is a front view of the drive unit in a state in which first ratchet hooks of a coupling are engaged with second ratchet hooks of a second rotary body.
Figure 6:
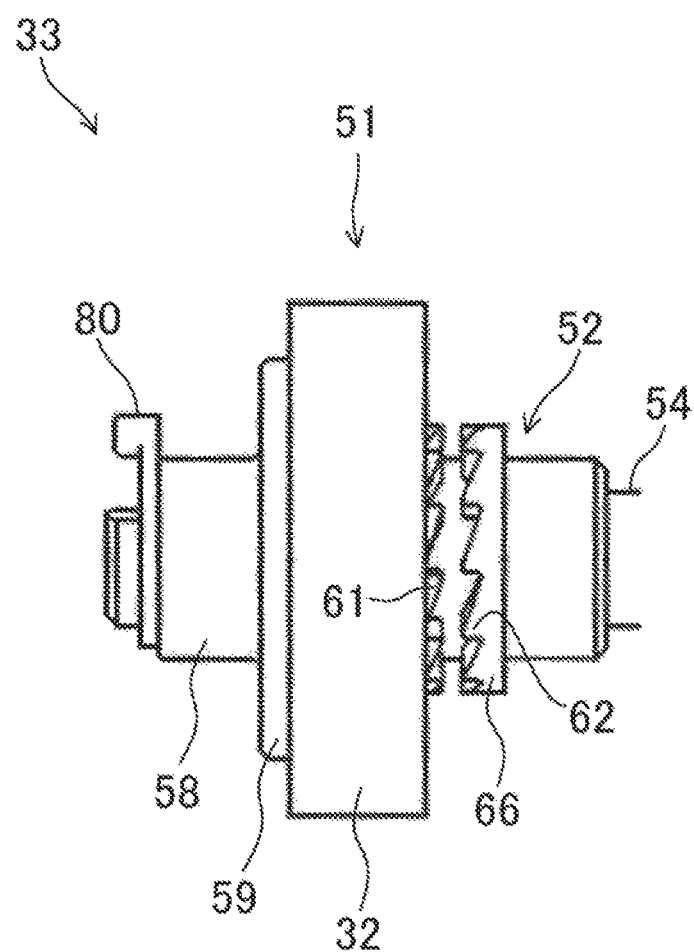
FIG. 6 is a front view of the drive unit in a state in which the first ratchet hooks of the coupling are disengaged from the second ratchet hooks of the second rotary body.
Figure 7:
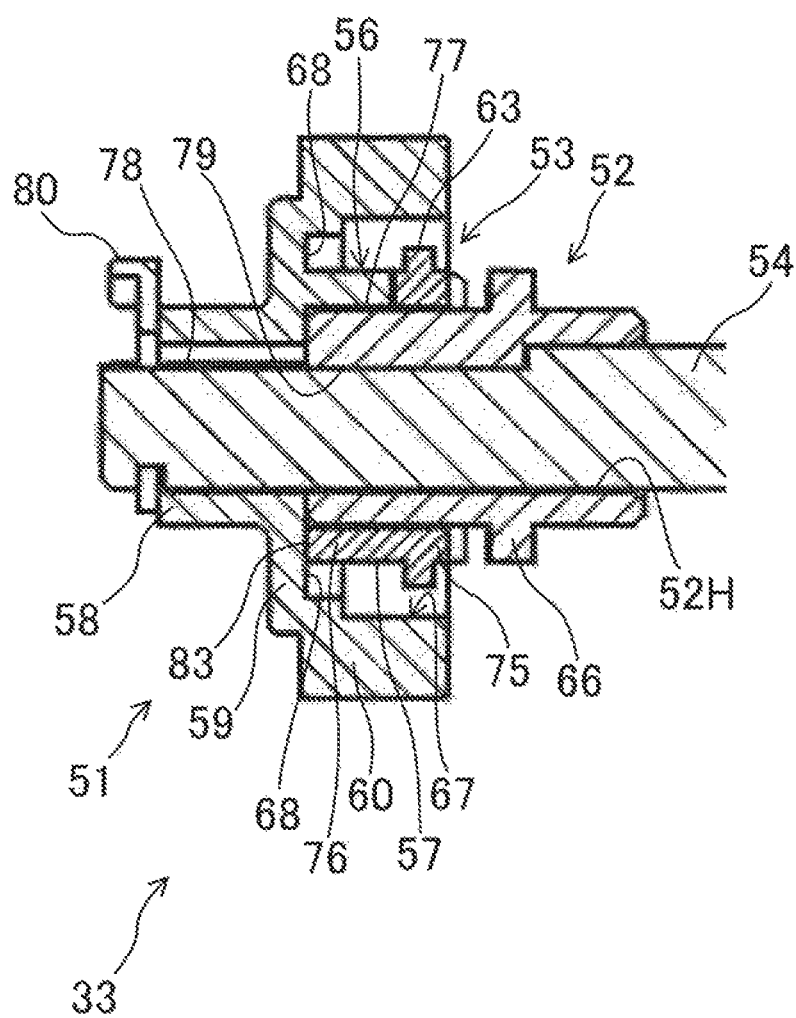
FIG. 7 is a cross-sectional view of the drive unit in the state in which the first ratchet hooks of the coupling are disengaged from the second ratchet hooks of the second rotary body.

A first end portion 75 (equivalent to a first opposing portion) of the coupling 53 adjacent to the second end of the support shaft 54 opposes the first flange 66 (equivalent to a second opposing portion) of the rotary body 52 in the axial direction of the support shaft 54 (see FIG. 7). First ratchet hooks 61 are disposed on the first end portion 75 of the coupling 53, and second ratchet hooks 62 are disposed on the first flange 66 of the rotary body 52, as illustrated in FIGS. 4 and 6. The first ratchet hooks 61 and the second ratchet hooks 62 can engage with each other.

A second end portion of the coupling 53, i.e., an end portion 76 (equivalent to a third opposing portion) of a coupling piece 57 disposed closer to the first end of the support shaft 54 than the second flange 63 opposes the bottom wall 59 (equivalent to a fourth opposing portion) of the depression 67 in the driving gear 51 in the axial direction of the support shaft 54. A cam face 74M (see FIG. 9) is disposed on the end portion 76 of the coupling piece 57, and a cam 56 (see FIG. 8) is disposed on the bottom wall 59 of the depression 67 in the driving gear 51.

Figure 8:
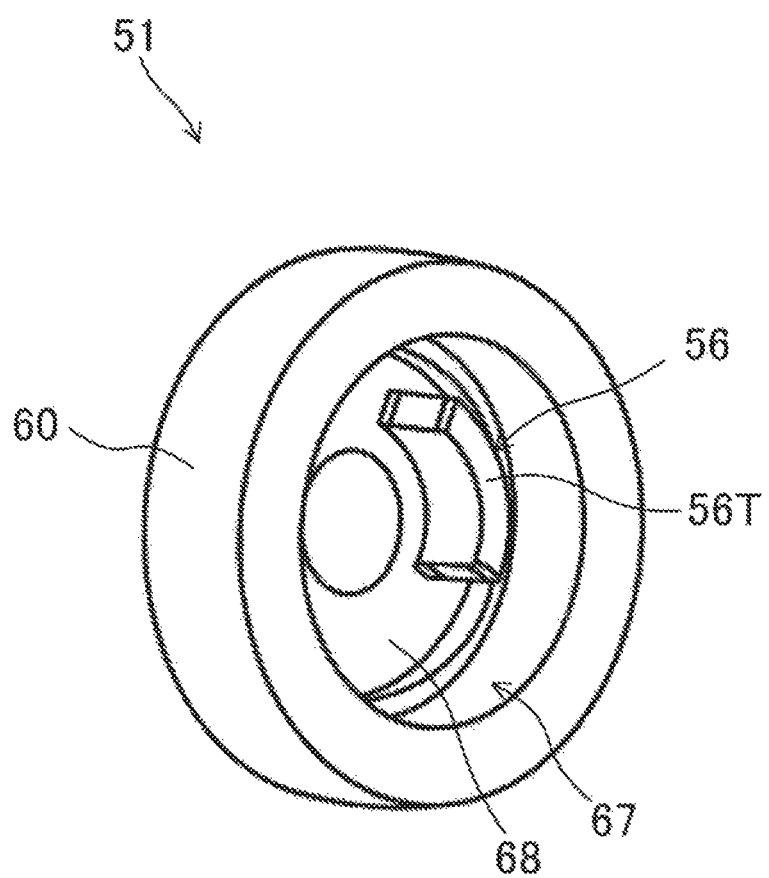
FIG. 8 is a perspective view of a portion of a first rotary body.

With reference to FIG. 8, the cam 56 is shaped as an arcuate rib when viewed from the axial-center direction of the driving gear 51 and erects from the bottom wall 59.

Figure 9:
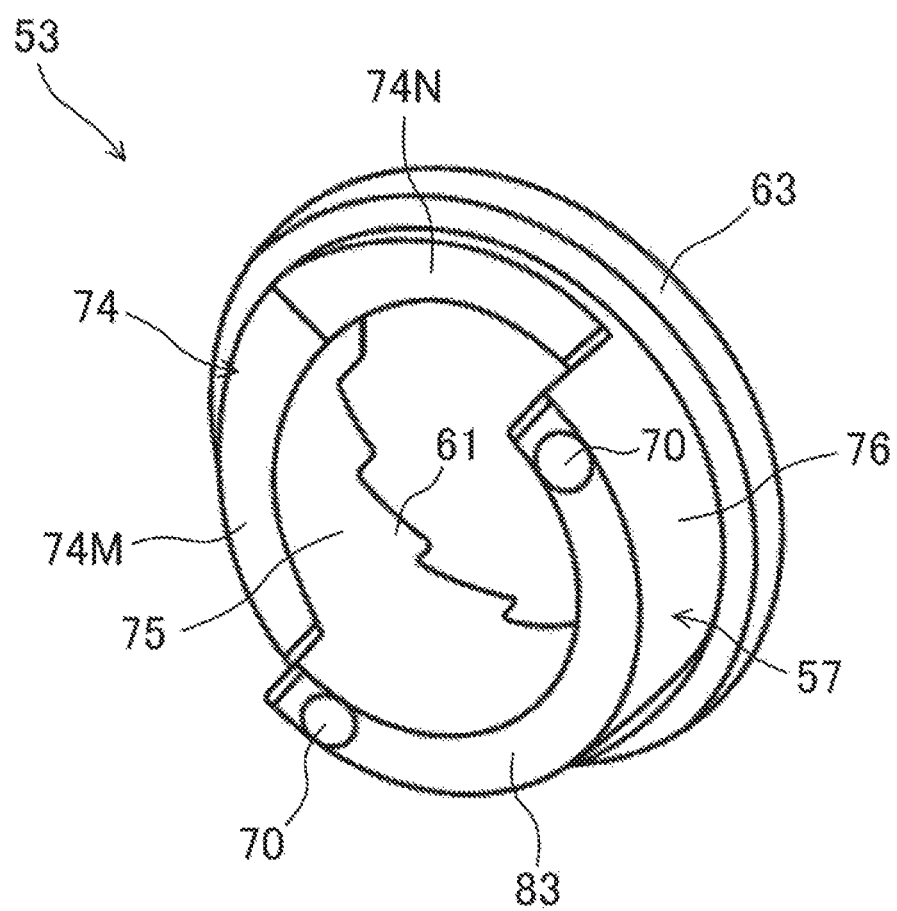
FIG. 9 is a perspective view of the coupling.
Figure 10:
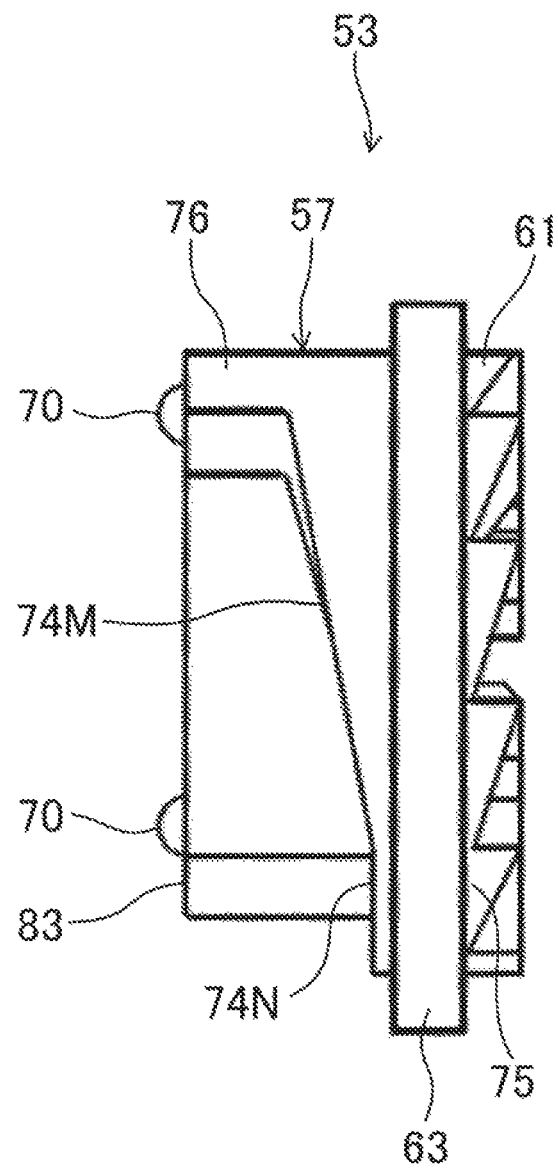
FIG. 10 is a front view of the coupling.
Figure 11:
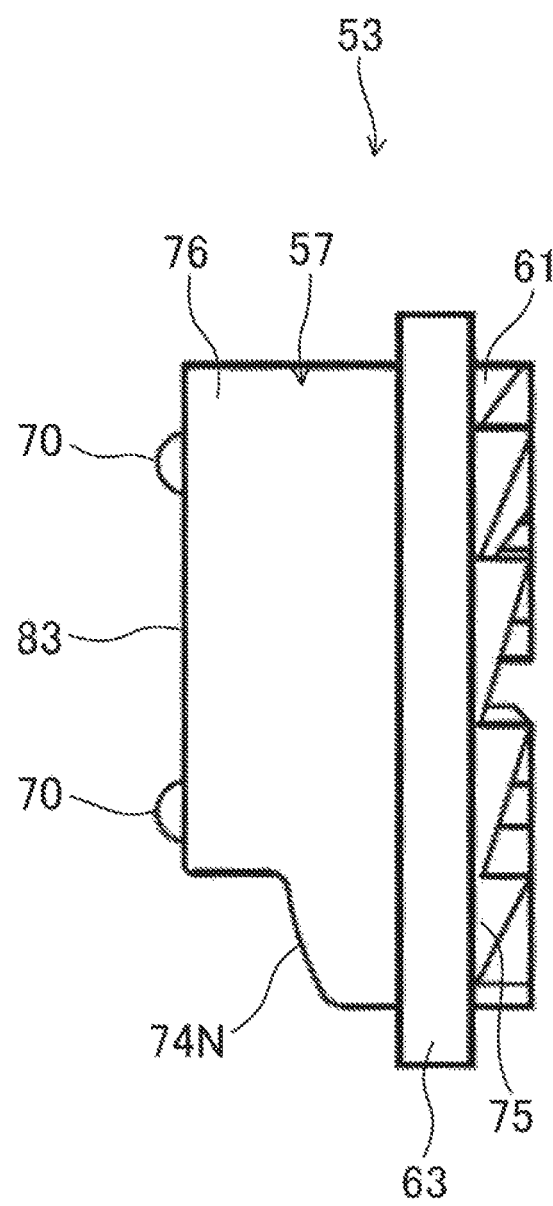
FIG. 11 is a front view of the coupling slightly rotated from the state illustrated in FIG. 10.
Figure 12:
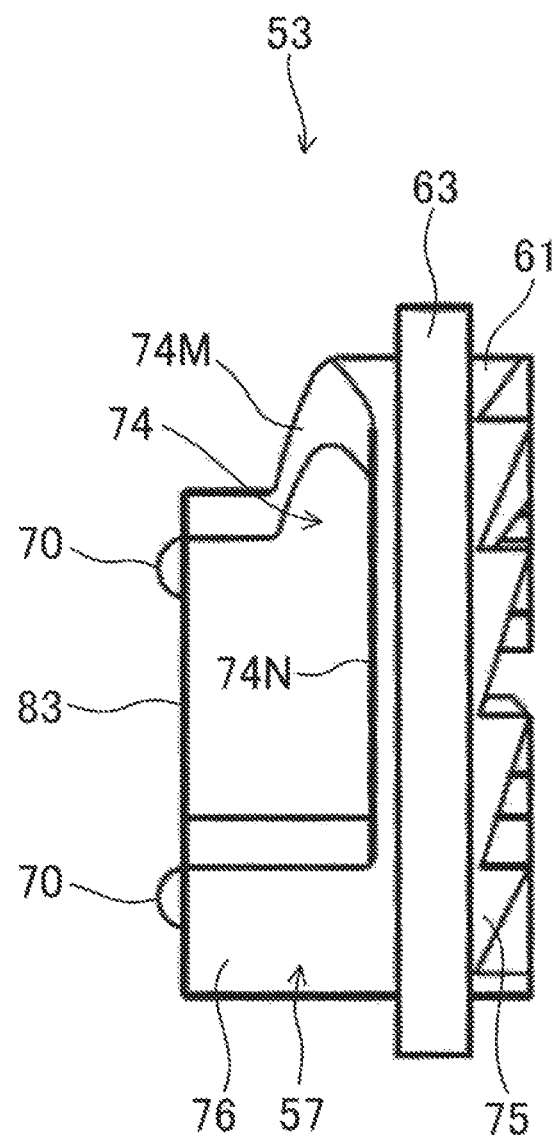
FIG. 12 is a front view of the coupling slightly rotated from the state illustrated in FIG. 11.
Figure 13:
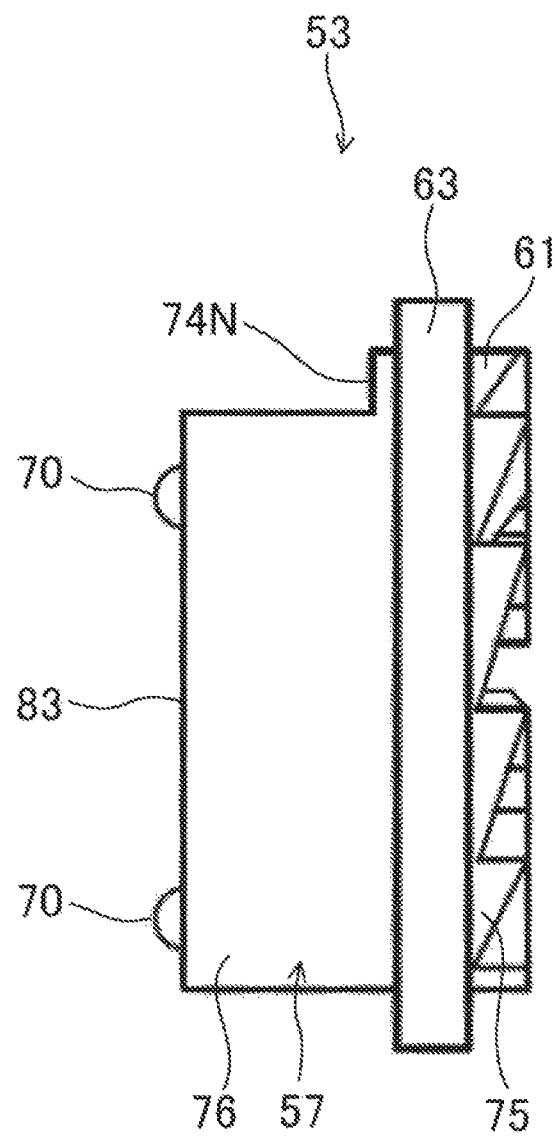
FIG. 13 is a front view of the coupling slightly rotated from the state illustrated in FIG. 12.
Figure 14:
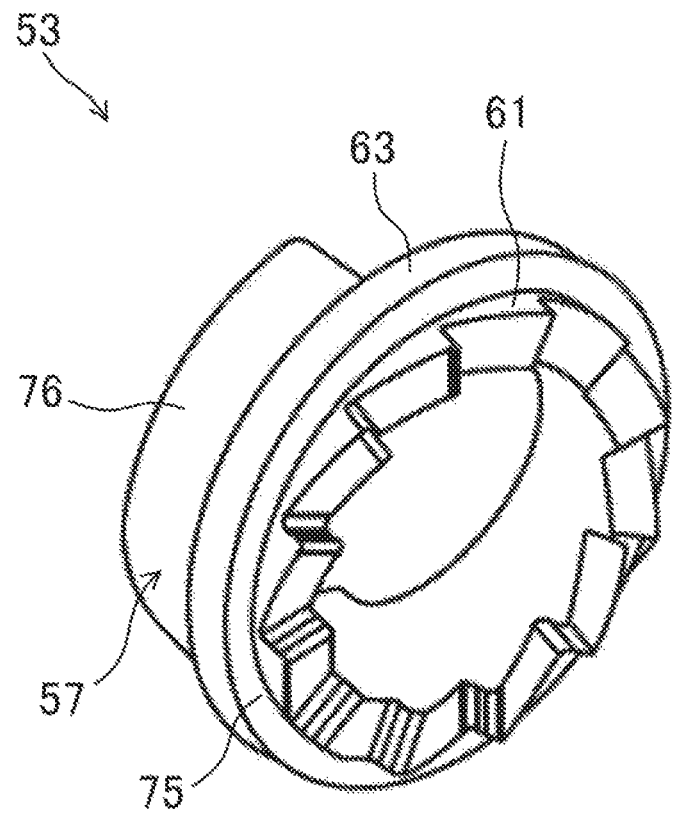
FIG. 14 is a front view of the coupling slightly rotated from the state illustrated in FIG. 13.

A segment of the coupling piece 57 corresponding to approximately half of the circumference of the coupling piece 57 is cut away, as illustrated in FIG. 9. This segment of the coupling piece 57 has an end face 74. Approximately half of the end face 74 is a flat face 74N orthogonal to the axial-center direction of the coupling 53, and the other half of the end face 74 is the cam face 74M. The cam face 74M tilts such that the distance between the cam face 74M and the first ratchet hooks 61 increases with distance from the flat face 74N in the circumferential direction.

An end face 83 of another segment of the coupling piece 57 corresponding to the uncut approximate half of the circumference (equivalent to the end face of the third opposing portion of the coupling) is provided with two protrusions 70. The two protrusions 70 are disposed on the end face 83 apart from each other in the circumferential direction at the two circumferential end portions of the end face 83. The protrusions 70 have hemispherical shapes.

While the transmission of torque is turned off, the protrusions 70 come into point-contact (contact) with the inner bottom face 68 of the depression 67 in the driving gear 51 in the axial direction. A top face 56T (see FIG. 8) of the cam 56 comes into contact with the flat face 74N.

When the driving gear 51 rotates in the forward direction, the cam 56 slides over the cam face 74M. The camming action of the cam 56 and the cam face 74M causes the protrusions 70 to move away from the inner bottom face 68 of the depression 67 in the driving gear 51, and the coupling 53 shifts from the driving gear 51 toward the rotary body 52. The first ratchet hooks 61 engage with the second ratchet hooks 62 to turn on the transmission of torque, as illustrated in FIGS. 4 and 5.

When the driving gear 51 rotates in the backward direction, the first ratchet hooks 61 slide over the second ratchet hooks 62, and the coupling 53 shifts from the rotary body 52 toward the driving gear 51. This results in disengagement of the first ratchet hooks 61 and the second ratchet hooks 62 (see FIGS. 6 and 7). This turns off the transmission of torque. The force of the coupling 53 shifting from the rotary body 52 toward the driving gear 51 causes the protrusions 70 to come into contact with the inner bottom face 68 of the depression 67 in the driving gear 51.

According to the present disclosure, since the protrusions 70 comes into point-contact (contact) with the inner bottom face 68 of the depression 67 in the driving gear 51 in the axial direction while the transmission of torque is turned off, the end face 83 of the coupling piece 57 can be prevented from coming into tight contact with the inner bottom face 68 of the depression 67 in the driving gear 51.

Thus, the coupling 53 can be prevented from rotating together with the driving gear 51 when the driving gear 51 starts rotating in the forward direction. This can assure the coupling 53 to provide a function of turning on/off the transmission of torque from the driving gear 51 to the rotary body 52. This can also reduce noise generated by collision of the coupling 53 and the driving gear 51 during the turning on/off of operation.

Other Embodiments (1) The structure may have protrusions 70 that come into line-contact with the inner bottom face 68 of the depression 67 in the driving gear 51. This structure, too, can prevent the end face 83 of the coupling piece 57 from coming into tight contact with the inner bottom face 68 of the depression 67 in the driving gear 51.

(2) The protrusions 70 may be provided in any number other than two.

As described above, the present disclosure is suitable for drive units of image forming apparatuses, in particular, drive units of copiers, facsimiles, printers, and multifunction peripherals (MFPs).

What is claimed is:

1. A drive unit for an image forming apparatus, comprising:

a first rotary body that is supported on a support shaft and rotatable in a forward direction and a backward direction around the support shaft;

a second rotary body that receives torque from the first rotary body and rotates together with the support shaft; and a coupling that is supported by the support shaft and reciprocates between the first rotary body and the second rotary body to turn on and turn off transmission of the torque from the first rotary body to the second rotary body; wherein, the coupling includes a first opposing portion and the second rotary body includes a second opposing portion, the first opposing portion and the second opposing portion facing each other in the axial direction of the support shaft, the coupling includes a third opposing portion and the first rotary body includes a fourth opposing portion, the third opposing portion and the fourth opposing portion facing each other in the axial direction of the support shaft, the first opposing portion of the coupling includes a first ratchet hook and the second opposing portion of the second rotary body includes a second ratchet hook, the first ratchet hook and the second ratchet hook engaging each other, one of the third opposing portion of the coupling and the fourth opposing portion of the first rotary body has a cam on an end face thereof and the other one of the third opposing portion of the coupling and the fourth opposing portion of the first rotary body has a cam face on an end face thereof, when the first rotary body rotates in a forward direction, the coupling shifts from the first rotary body toward the second rotary body as a result of a camming action of the cam and the cam face and turns on transmission of the torque, when the first rotary body rotates in a backward direction, the coupling shifts from the second rotary body toward the first rotary body and turns off transmission of the torque, at least one protrusion is provided on a portion other than the cam or the cam face of the end face of one of the third opposing portion of the coupling and the fourth opposing portion of the first rotary body, and the at least one protrusion comes into contact with a portion other than the cam or the cam face of the end face of the other one of the third opposing portion and the fourth opposing portion in the axial direction while transmission of the torque is turned off.

2. The drive unit according to claim 1, wherein the contact that the at least one protrusion comes into is point-contact.

3. The drive unit according to claim 1, wherein the contact that the at least one protrusion comes into is line-contact.

4. The drive unit according to claim 1, wherein the first rotary body comprises a driving gear rotating in response to torque from a drive source rotatable in a forward direction and a backward direction.

* * * * *